DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 817

T900,005

METHOD OF TESTING TITANIUM ALLOYS

Donald J. Baron, Tolland, and William A. Snell, Hebron, Conn., assignors to United Aircraft Corporation, East Hartford, Conn.

Filed Apr. 7, 1971, Ser. No. 132,208

Int. Cl. C23b *9/00;* G01n *27/00, 31/00*

U.S. Cl. 204—1 T

No Drawing. 14 Pages Specification

A non-destructive test for areas of abnormal grain structure or chemical composition in titanium alloy billet slices or machined parts. The part is cleaned, washed, etched and then anodized at about 30 volts to oxidize the surface and coat on a deep blue layer. The anodized part is dipped in an acid solution to partially strip the coating and reveal segregation of abnormal grain structure or chemical composition. These abnormalities show in a contrasting blue or white color on the part which has become light gray to blue from the stripping. Aluminum-stabilized alpha segregation appears as a deep blue irregular line with or without branches on a lighter blue to gray background. Interstitial element-stabilized alpha (oxygen and nitrogen contamination due to process failures) also appears blue. Vanadium-stabilized beta segregation appears as a gray or white line with or without branches and is frequently associated with aluminum-stabilized alpha and can appear as adjacent parallel lines. Chemically pure titanium also appears light gray or white. Differentiation between the interstitial element-stabilized alpha an the aluminum-stabilized alpha and between the pure titanium and the vanadium-stabilized beta segregation can be accomplished by metallographic techniques employing surface replication methods.